United States Patent
Park et al.

(10) Patent No.: US 11,713,925 B2
(45) Date of Patent: Aug. 1, 2023

(54) SAGGER FOR FIRING SECONDARY BATTERY ACTIVE MATERIAL AND METHOD FOR MANUFACTURING SECONDARY BATTERY ACTIVE MATERIAL USING SAME

(71) Applicants: POSCO HOLDINGS INC., Seoul (KR); Research Institute of Industrial Science & Technology, Pohang-si (KR); POSCO FUTURE M CO., LTD, Pohang-si (KR)

(72) Inventors: Young-Min Park, Pohang-si (KR); Woo-Taek Kim, Pohang-si (KR); Hyeon-Woo Kim, Pohang-si (KR); Soon-Cheol Hwang, Pohang-si (KR); Choong-Mo Yang, Seoul (KR); Yoon-Cheol Park, Busan (KR); Keeyoung Jung, Pohang-si (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

(*) Notice: Subject to any disclaimer, the term of this patent is extended or adjusted under 35 U.S.C. 154(b) by 543 days.

(21) Appl. No.: 16/651,717

(22) PCT Filed: Sep. 28, 2018

(86) PCT No.: PCT/KR2018/011518
§ 371 (c)(1),
(2) Date: Mar. 27, 2020

(87) PCT Pub. No.: WO2019/066545
PCT Pub. Date: Apr. 4, 2019

(65) Prior Publication Data
US 2020/0256620 A1    Aug. 13, 2020

(30) Foreign Application Priority Data

Sep. 28, 2017 (KR) .......................... 10-2017-0126118

(51) Int. Cl.
*F27D 5/00* (2006.01)
*C04B 35/185* (2006.01)
*H01M 4/04* (2006.01)

(52) U.S. Cl.
CPC .......... *F27D 5/0068* (2013.01); *C04B 35/185* (2013.01); *H01M 4/0471* (2013.01)

(58) Field of Classification Search
CPC .................................................. H01M 4/0471
See application file for complete search history.

(56) References Cited

U.S. PATENT DOCUMENTS

| | | |
|---|---|---|
| 5,935,665 A | 8/1999 | Biek et al. |
| 2002/0102204 A1 | 8/2002 | Kohiro et al. |

(Continued)

FOREIGN PATENT DOCUMENTS

| | | |
|---|---|---|
| CN | 202814110 U | 3/2013 |
| CN | 205808131 U | 12/2016 |

(Continued)

OTHER PUBLICATIONS

JP2005257171A Translation from Espacenet (Year: 2005).*

(Continued)

*Primary Examiner* — Nathanael T Zemui
(74) *Attorney, Agent, or Firm* — Morgan, Lewis & Bockius LLP

(57) ABSTRACT

A sagger for firing an object to be fired includes an active material for a secondary battery. Carbon dioxide that is a reaction by-product produced during a positive electrode active material firing process can be smoothly discharged from the sagger, and such a smooth discharge of carbon dioxide can lower a residual lithium concentration of a (Continued)

positive electrode active material and thus can improve dispersibility of a positive electrode active material slurry and also improve capacity of a battery.

12 Claims, 1 Drawing Sheet

(56) References Cited

U.S. PATENT DOCUMENTS

| | | | |
|---|---|---|---|
| 2014/0017424 A1* | 1/2014 | Koike | C04B 35/195 |
| | | | 428/34.4 |
| 2015/0241126 A1 | 8/2015 | Sonntag et al. | |
| 2015/0241127 A1 | 8/2015 | Sonntag et al. | |
| 2017/0207453 A1* | 7/2017 | Oda | H01M 10/0525 |
| 2019/0252669 A1 | 8/2019 | Park et al. | |

FOREIGN PATENT DOCUMENTS

| | | |
|---|---|---|
| JP | H06-265276 A | 9/1994 |
| JP | 2005-257171 A | 9/2005 |
| JP | 2006-207958 A | 8/2006 |
| JP | 2009-227501 A | 10/2009 |
| JP | 2009-292704 A | 12/2009 |
| JP | 4592931 B2 | 9/2010 |
| JP | 5534657 B2 | 7/2014 |
| JP | 2015-137814 A | 7/2015 |
| JP | 2015-218098 A | 12/2015 |
| KR | 10-2001-0045759 A | 6/2001 |
| KR | 10-0314726 B1 | 11/2001 |
| KR | 10-2013-0051290 A | 5/2013 |
| KR | 20-0468934 Y1 | 9/2013 |
| KR | 10-2013-0115688 A | 10/2013 |
| KR | 20-2015-0003289 U | 9/2015 |
| KR | 20-2015-0003290 U | 9/2015 |
| KR | 10-2018-0017630 A | 2/2018 |
| WO | 2017/217625 A1 | 12/2017 |

OTHER PUBLICATIONS

Japanese Office Action dated Mar. 23, 2021 issued in Japanese Patent Application No. 2020-517561.
Chinese Office Action dated Apr. 25, 2021 issued in Chinese Patent Application No. 201880063115.1 (with English translation).
International Search Report dated Jan. 10, 2019 issued in International Patent Application No. PCT/KR2018/011518 (with English translation).

* cited by examiner

[FIG. 1]
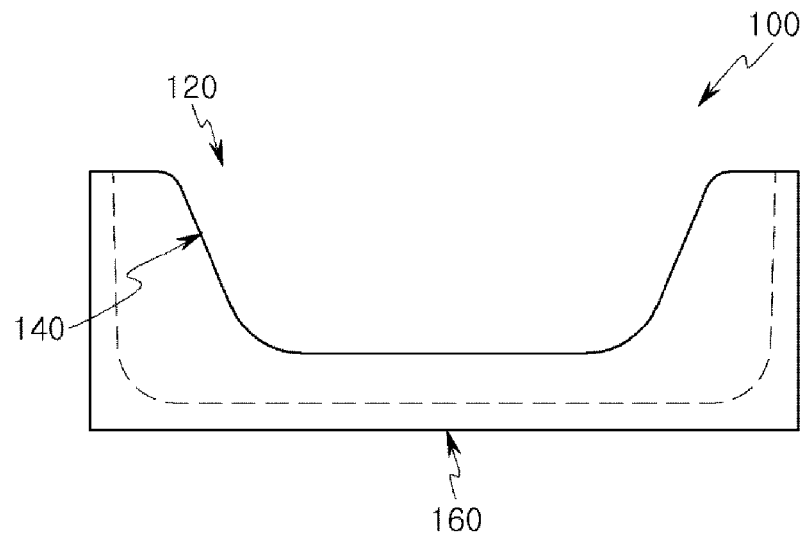
[FIG. 2]
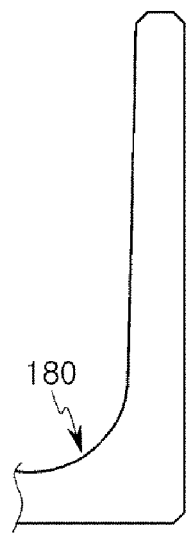

SAGGER FOR FIRING SECONDARY BATTERY ACTIVE MATERIAL AND METHOD FOR MANUFACTURING SECONDARY BATTERY ACTIVE MATERIAL USING SAME

CROSS-REFERENCE OF RELATED APPLICATIONS

This application is the U.S. National Phase under 35 U.S.C. § 371 of International Patent Application No. PCT/KR2018/011518, filed on Sep. 28, 2018, which in turn claims the benefit of Korean Application No. 10-2017-0126118, filed on Sep. 28, 2017, the entire disclosures of which applications are incorporated by reference herein.

TECHNICAL FIELD

The present disclosure relates to a sagger for firing a secondary battery active material and a method for manufacturing the secondary battery active material using the same.

BACKGROUND ART

In recent years, with the rapid expansion of a compact electronic device such as a mobile phones, laptop computers, and the like, as well as the expansion of the market for vehicle batteries, demand for non-aqueous electrolyte secondary batteries, especially, lithium secondary batteries, is growing rapidly.

Since a lithium secondary battery has high energy density, excellent output characteristics, and is possible to be made to be lightweight, a lithium secondary battery is widely used as a mobile communications device, a hybrid electrical vehicle, an energy storage device for home appliances, or the like. Accordingly, in industrial production of a positive electrode active material, an electrode material of a lithium secondary battery, mass production thereof having a high quality is required with a certain quality.

A core material of the lithium secondary battery is classified as a positive electrode, a negative electrode, an electrolyte, and a separation film. A positive electrode material of a commercially available lithium secondary battery may include $LiCoO_2$ or a nickel cobalt manganese (NCM)-based positive electrode active material. Such a positive electrode active material may be prepared by inserting a raw material including a compound and a transition metal compound in a sagger, which is a firing container, and firing the raw material at a temperature at a temperature in a range of 400 to 1100° C. according to a type of raw material.

As a related document with regard to a sagger for firing an active material for a secondary battery used during the firing process, Patent Documents 1 to 3 may be disclosed. Patent Document 1 discloses a method of manufacturing a positive electrode material for a lithium secondary battery by limiting a composition of raw materials to be inserted into a firing furnace, a temperature range during firing, a firing time, and the like, and Patent document 2 discloses a relationship between the firing time and a filling amount of a firing raw material, in a manufacturing method of a lithium nickel complex oxide. In addition, Patent Document 3 discloses a technology for reducing a change in characteristics of an object to be fired by coating zirconia on a surface of the sagger formed of alumina as a main raw material.

Meanwhile, in the firing process, carbon dioxide is generated as a reaction by-product, and in particular, carbon dioxide remaining in the sagger may react with lithium oxide on the surface of the positive electrode active material to form lithium carbonate, thereby causing a problem such as reducing capacity of a battery. However, Patent Documents 1 to 3 relate to conditions of the firing process, and there is a problem that deterioration of battery performance due to carbon dioxide generated as a reaction by-product in the firing process cannot be solved.

PRIOR ART DOCUMENT (Patent Document 1) Japanese registered patent No. 4592931
(Patent Document 2) Japanese registered patent No. 5534657
(Patent Document 3) Korean publication patent No. 10-1999-0049188

DISCLOSURE

Technical Problem

An aspect of the present disclosure is to provide a sagger for firing a secondary battery active material having a structure that can smoothly distribute atmospheric gas in the sagger in a firing process, and also smoothly discharge carbon dioxide generated as a by-product.

In addition, an aspect of the present disclosure is to provide a method for manufacturing an active material for a secondary battery using the sagger.

Technical Solution

According to an aspect of the present disclosure, in a sagger for firing an object to be fired including an active material for a secondary battery, the sagger includes a notch portion that is recessed from an upper portion of a side wall thereof to open a portion of the side wall, wherein a ratio of an area of the notch portion to an area of the side wall is 30% to 70%, and an edge at which a side wall of the sagger contacts a lower surface of the sagger is configured by a rounded portion.

A radius of curvature of the rounded portion may be greater than or equal to 25 mm.

The notch portion may have a depth of 60 to 90% from an upper surface of the sagger.

The sagger may include at least a pair of opposing side walls, and the notch portion may be formed on the at least a pair of opposing side walls.

A through-hole may be formed on a lower surface of the sagger.

The sagger may be further provided with a cover for covering an upper surface opened for inflow and outflow of an object to be fired.

The cover may be formed with a through-hole.

The sagger may be made of one or more selected from mullite ($3Al_2O_3 \cdot 2SiO_2$), cordierite (($Mg, Fe^{+3})_2Al_4Si_5O_{18}$), spinel ($MgAl_2O_4$) and zircon ($ZrSiO_4$).

According to another aspect of the present disclosure, a method for manufacturing an active material for a secondary battery includes operations of: loading a raw material into the sagger and inserting the raw material in a firing furnace and then firing; and recovering the raw material in the sagger after the firing, and cooling and pulverizing to prepare an active material for a secondary battery is provided.

A size of the raw material to be loaded into the sagger by molding powder is increased.

The firing may be performed in an oxygen atmosphere or an inert gas atmosphere.

Two or more saggars may be disposed in the firing furnace.

The two or more saggers may be stacked in two or more layers and then fired in the firing furnace.

Advantageous Effects

According to the present disclosure, carbon dioxide, that is a reaction by-product produced during a positive electrode active material firing process can be smoothly discharged from a sagger, and such a smooth discharge of carbon dioxide can lower a residual lithium concentration of the positive electrode active material and thus can improve dispersibility of a positive electrode active material slurry, and also improve a capacity of a battery.

DESCRIPTION OF DRAWINGS

FIG. 1 is a schematic view illustrating a sagger according to an embodiment of the present disclosure.

FIG. 2 is a schematic view illustrating an inside of the sagger according to an embodiment of the present disclosure.

BEST MODE FOR INVENTION

Hereinafter, preferred embodiments of the present disclosure will be described with reference to various embodiments. However, the embodiments of the present disclosure may be modified in various other forms, and the scope of the present disclosure is not limited to the embodiments described below.

The present disclosure relates to a sagger for firing a secondary battery active material and a method for manufacturing a secondary battery active material using the same. More specifically, the present disclosure provides a sagger having a structure that can smoothly distribute atmosphere gas in the sagger from an outside, and also smoothly discharge carbon dioxide that is a by-product produced during the firing process.

In general, a secondary battery positive electrode active material is manufactured by firing a raw material in a high-temperature firing furnace, and in this case, the raw material is loaded into the sagger and inserted in the firing furnace. In this case, in order to obtain a positive electrode active material of uniform quality by firing, inflow of atmosphere gas into the sagger should be made smoothly, and also required to be discharged without remaining carbon dioxide inside the sagger.

To this end, according to an aspect of the present disclosure, in a sagger for firing an object to be fired including an active material for a secondary battery, the sagger includes a notch portion that is recessed from an upper portion of a side wall thereof to open a portion of the side wall, wherein a ratio of an area of the notch portion to an area of the side wall is 30% to 70%, and an edge at which a side wall of the sagger contacts a lower surface of the sagger is configured by a rounded portion.

A sagger generally used in the prior art has an opened upper surface, and an area of the notch portion formed on a side wall thereof is about 0 to 10%. When firing using such a sagger, atmosphere gas is mostly introduced through the upper surface of the sagger, and in this case, the atmosphere gas is mainly in contact with a raw material located in an upper layer portion of the raw materials loaded into the sagger, and a contact probability with a raw material located in a deep portion such as a bottom surface of the sagger is relatively low, such that it is difficult to obtain uniform firing quality.

However, as in the present disclosure, by increasing the area of the notch portion formed on the side wall, the atmosphere gas may be supplied into the sagger through the notch portion, and thus, the atmosphere gas may be uniformly supplied to the raw material of the positive electrode active material loaded into the sagger, thereby achieving more uniform firing quality. More specifically, while the atmosphere gas in the firing furnace, in particular, oxygen flows into the sagger by the notch portion formed on the side wall of the sagger and rises to the upper portion of the sagger, a homogeneous fired product may be manufactured by contacting the raw material loaded into the sagger.

Furthermore, even during the flow of the atmosphere gas flowing to the side surface of the sagger, it is possible to introduce the atmosphere gas into the sagger as well as by-products such as carbon dioxide, water vapor generated during firing may be smoothly discharged from the sagger.

When carbon dioxide remains in the sagger, it may cause a problem that lithium oxide and lithium carbonate are formed on the surface of the positive electrode active material during a lowering temperature process after firing, and dispersibility of a slurry is reduced and a capacity of a battery is reduced in a coating process of the positive electrode active material. However, as in the present disclosure, when the area of the notch portion of the side wall is 30% or more, a gas flow due to the inflow of the atmosphere gas through the notch portion may suppress the concentration of carbon dioxide or water vapor on an inner bottom of a fireproof wall.

It is preferable that a ratio of the area of the notch portion formed on the side wall of the sagger is 30 to 70% with respect to the area of the side wall thereof. It can be adjusted according to a particle size of a material to be fired loaded in the saggar, but it may be preferably 30% or more in terms of a smooth supply of oxygen or air as reaction gas and a smooth discharge of carbon dioxide and water vapor as a reaction product, and also when a loss of the fired material is prevented during firing or the sagger is loaded in two or more stages, it may be preferably 70% or less in terms of supporting the sagger located in a lower stage thereof.

An increase in the area of the notch portion may be achieved by adjusting a height at which the notch portion is formed on the side wall of the sagger. More specifically, the notch portion may have a depth of 60 to 90% from the upper surface of the saggar. When a depth from the upper surface of the sagger is less than 90%, since a powder loading amount of the saggar may be reduced and the productivity may decrease, it is preferable that the notch portion has a depth of 60 to 90% from the upper surface of the sagger. In other words, the notch portion may be formed from a position corresponding to 10 to 40% of the total heights from the lower surface of the sagger.

As described above, when the notch portion is formed in side wall portions facing each other, a more homogeneous fired product may be produced by making a firing atmosphere in the sagger uniformly during firing. In addition, the shape of the notch portion may be formed in various shapes, such as rectangular, trapezoidal, or the like.

Meanwhile, in the sagger according to an embodiment of the present disclosure, an edge at which a side wall of the sagger contacts a lower surface may be configured by a rounded portion, that is, a curved shape, and it is preferable that a radius of curvature of the rounded portion is 25 mm or more. Thus, when the radius of curvature is greater than or equal to 25 mm, it is possible to suppress a concentration of carbon dioxide or water vapor generated during a firing reaction at an inner edge thereof. As the radius of curvature increases, a volume of a dead zone decreases, so that the concentration of carbon dioxide or water vapor is suppressed.

The sagger is not particularly limited, but the sagger may be mullite ($3Al_2O_3 \cdot 2SiO_2$), cordierite ($(Mg, Fe^{+3})_2Al_4Si_5O_{18}$), spinel ($MgAl_2O_4$), zircon ($ZrSiO4$), and the like, but as a combination of two or more thereof, may be formed of a material commonly used as a material of the sagger.

Meanwhile, the sagger may be disposed in the firing furnace in a form of having an opened upper surface as needed, and may also be subjected to a firing process in the firing furnace by covering the upper surface of the sagger with a cover. In this case, a through-hole for a flow of gas may also be formed on the cover. By covering the cover as described above, the inflow of foreign materials into the sagger may be suppressed, and the flow of gas may be achieved by having the through-hole formed on the lower surface of the sagger and the through-hole formed on the cover.

As a method for manufacturing an active material, a method for manufacturing an active material may be generally applied, except for using the sagger provided by the preset disclosure, and is not particularly limited thereto. The method for manufacturing an active material includes operations of: loading a raw material into the sagger according to the present disclosure and inserting the raw material in a firing furnace and then firing; and recovering the raw material in the sagger after the firing, and cooling pulverizing to prepare an active material for a secondary battery. In this case, the firing may be performed in an oxygen atmosphere or an inert gas atmosphere.

In this case, the raw material may be loaded into the sagger in a powder form, and may be loaded into the sagger by increasing a size of the powder-form raw material.

Furthermore, the sagger disposed in the sintering furnace may be one, and may be two or more. In this case, the sagger may be disposed in a single layer of a plurality of saggers, and may be fired by stacking two or more saggers in two or more layers. In the sagger of the present disclosure, a through-hole is formed in a lower portion thereof, such that even though two or more layers of saggers are stacked, the atmosphere gas introduced into the through-hole formed on the bottom of the lower sagger and the notch portion on the side wall thereof may be introduced through the through-hole formed on the bottom of the upper sagger and the notch portion of the upper side wall.

MODE FOR INVENTION

Example

Hereinafter, the present disclosure is described with Example in more detail. The following Example shows an embodiment of the present disclosure, and the present disclosure is not limited thereto.

Example 1

A notch portion having a height of 35 mm was formed on a side wall of a sagger in which a total height of a side wall thereof is 120 mm. A total area of the side wall was 396 cm$^2$, and an area of the notch portion corresponds to 212 cm$^2$. In addition, a radius of curvature of a rounded portion of a side wall of a lower surface of the sagger was set to be 25 mm.

Raw material powder ($Li_2CO_3+Ni_{0.6}Co_{0.2}Co_{0.2}(OH)_2$) for preparing a positive electrode active material was molded into a spherical shape having a diameter of 50 mm in the sagger, and then filled with 5 kg of a molded body and disposed in a firing furnace. Air was injected as oxygen containing gas in the firing furnace and fired.

After firing, the saggar was removed from the firing furnace and cooled to obtain a positive electrode active material. A residual lithium amount and coin cell characteristics of the positive electrode active material thus obtained were measured, and the results thereof was shown in Table 1.

Comparative Example 1

Except that a notch portion having a height of 10 mm is formed on a side wall of a sagger, a positive electrode active material was prepared by firing and cooling in the same manner as in Example 1.

Residual lithium amount and coil cell characteristics of the prepared positive active material were measured, and the results thereof were shown in Table 1.

Comparative Example 2

A positive electrode active material was prepared by firing and cooling in the same manner in Example 1 except that a radius of curvature of a rounded portion of a side wall and a lower surface of the sager is 15 mm.

A residual lithium amount and coin cell characteristics of the prepared positive active material were measured, and the results thereof were shown in Table 1.

TABLE 1

|  | Example 1 | Comparative Example 1 | Comparative Example 2 |
| --- | --- | --- | --- |
| Residual LiOH (ppm) | 1130 | 1350 | 1250 |
| Residual Li$_2$CO$_3$ (ppm) | 3276 | 8700 | 4720 |
| Initial discharge capacity (mAh/g, @0.1 C) | 176 | 175 | 175 |
| Initial charge/ discharge efficiency (%) | 91 | 90 | 90 |
| Cycle life(50$^{th}$/1$^{st}$@1 C) | 98 | 97 | 97 |

As can be seen from Table 1, it can be seen that, in the case of Example 1, a residual amount of lithium carbonate was reduced by more than 60% compared to Comparative Example 1, a residual amount of lithium carbonate was reduced by more than 30% compared to Comparative Example 2. Furthermore, it can be seen that coil cell characteristics were improved by improving an initial discharge capacity, an initial charge and discharge efficiency, and a cycle life in Example 1, as compared with Comparative Examples 1 and 2.

While example embodiments have been shown and described above, it will be apparent to those skilled in the art that modifications and variations could be made without departing from the scope of the present inventive concept as defined by the appended claims.

EXPLANATION OF REFERENCE SIGNS

100: sagger
120: upper surface
140: notch portion
160: lower surface
180: rounded portion

The invention claimed is:

1. A sagger for firing an object to be fired including an active material for a secondary battery, the sagger, comprising:
   a notch portion that is recessed from an upper portion of a side wall thereof to open a portion of the side wall, wherein a ratio of an area of the notch portion to an area of the side wall is 30 to 70%,
   an edge at which a side wall of the sagger contacts a lower surface of the sagger on which the object to be fired is loaded is configured by a rounded portion, and
   a radius of curvature of the rounded portion is greater than or equal to 25 mm.

2. The sagger of claim 1, wherein the notch portion has a depth of 60 to 90% from an upper surface of the sagger.

3. The sagger of claim 1, wherein the sagger comprises at least a pair of opposing side walls, and the notch portion is formed on the at least a pair of opposing side walls.

4. The sagger of claim 1, wherein a through-hole is formed on a lower surface of the sagger.

5. The sagger of claim 1, wherein the sagger is further provided with a cover for covering an upper surface opened for inflow and outflow of an object to be fired.

6. The sagger of claim 5, wherein a through-hole is formed on the cover.

7. The sagger of claim 1, wherein the sagger consists of one or more selected from mullite ($3Al_2O_3 2SiO_2$), cordierite ($(Mg, Fe^{+3})2Al_4Si_5O_{18}$), spinel ($MgAl_2O_4$) and zircon ($ZrSiO_4$).

8. A method for manufacturing an active material for a secondary battery comprising operations of:
   loading a raw material into the sagger according to claim 1 and inserting the raw material in a firing furnace and then firing; and
   recovering the raw material in the sagger after the firing, and cooling and pulverizing to prepare an active material for a secondary battery.

9. The method for manufacturing the active material for the secondary battery of claim 8, wherein a size of the raw material to be loaded into the sagger by molding powder is increased.

10. The method for manufacturing the active material for the secondary battery of claim 8, wherein the firing is performed in an oxygen atmosphere or an inert gas atmosphere.

11. The method for manufacturing the active material for the secondary battery of claim 8, wherein two or more saggers are disposed in the firing furnace.

12. The method for manufacturing the active material for the secondary battery of claim 8, wherein the two or more saggers are stacked in two or more layers in the firing furnace and then fired.

* * * * *